July 20, 1965 D. F. DIMON 3,196,350

NARROW BANDWIDTH HIGH Q COMMUNICATION SYSTEM

Filed Jan. 15, 1962 2 Sheets-Sheet 1

INVENTOR.
DONALD F. DIMON
BY Fulwider Mattingly & Huntley
ATTORNEYS

NARROW BANDWIDTH HIGH Q COMMUNICATION SYSTEM

Filed Jan. 15, 1962 2 Sheets-Sheet 2

INVENTOR.
DONALD F. DIMON
BY Zulwider Mattingly & Huntley
ATTORNEYS 3,196,350
NARROW BANDWIDTH HIGH Q COMMUNICATION SYSTEM
Donald F. Dimon, 5246 Crestwind Drive, Rolling Hills, Calif.
Filed Jan. 15, 1962, Ser. No. 166,295
12 Claims. (Cl. 325—26)

This invention relates generally to communication systems, and more particularly to a novel and useful high Q communication system having an extremely narrow system bandwidth.

Standard radio communication systems are primarily limited in operating range characteristically by a ratio of signal power to noise power. Noise power is related proportionately to bandwidth. Thus, in general, the narrower the bandwidth, the less will be the noise power in a system and the greater will be its operating range. On the other hand, many forms of information include a large variety of signals having a large spread of modulation frequencies involving a wide bandwidth. Therefore, the greater the modulation frequency spread, the wider is the modulation bandwidth and the poorer will be the signal to noise ratio, in conventional systems.

In general, the bandwidth of a circuit decreases with increased values of Q. The bandwidth of a tuned circuit can be made extremely narrow by maintaining a very high Q for the circuit. By modulating the signal in a very high Q resonant circuit by the novel means as disclosed herein, and simultaneously maintaining the very high Q of the circuit, an extremely well-formed modulated signal is produced. If this modulated signal is duplicated in another very high Q resonant circuit which is dynamically modulated to reproduce the modulated to reproduce the modulated signal while maintaining the very high Q thereof, and this duplicate signal is then detected, an extremely noise-free, demodulated signal is obtained. Thus, a high Q system involving respective resonant circuits, in which modulation and demodulation occur, provides a communication system of extraordinary performance capabilities.

Further, when a high Q resonant circuit is operating on the same frequency as another high Q resonant circuit, a condition conducive to high energy transfer between the resonant circuits results. Thus, and as will become more evident hereinafter, in a high Q transmitting and receiving system where isolating means such as buffer amplifiers are not used between resonant section and antenna, high energy transfer takes place between the transmitter and the receiver.

It is an object of this invention to provide a communication system including resonant circuits which are maintained at very high Q values such that, at every instant, an extremely narrow system bandwidth is obtained.

Another object of the invention is to provide a transmitter including novel high Q means for generating and modulating a carrier frequency oscillation.

A further object of the invention is to provide a receiver including novel high Q means for duplicating an incoming modulated signal, the duplicate signal being a generated modulated carrier which is closely confined to a well defined energy distribution spectrum, despite large excursions in frequency and amplitude of the modulated carrier.

A still further object of this invention is to provide a dynamically tuned circuit which operates at very high Q at all times.

It is also an object of the invention to provide a dynamically variable system which operates continuously at an optimum level by adjusting or changing itself instant by instant in accordance with changes in characteristics of the signals being processed there-through.

Other objects and advantages of this invention will become apparent from the following description of an illustrative embodiment of the invention shown in the accompanying drawings, in which.

Figure 1:
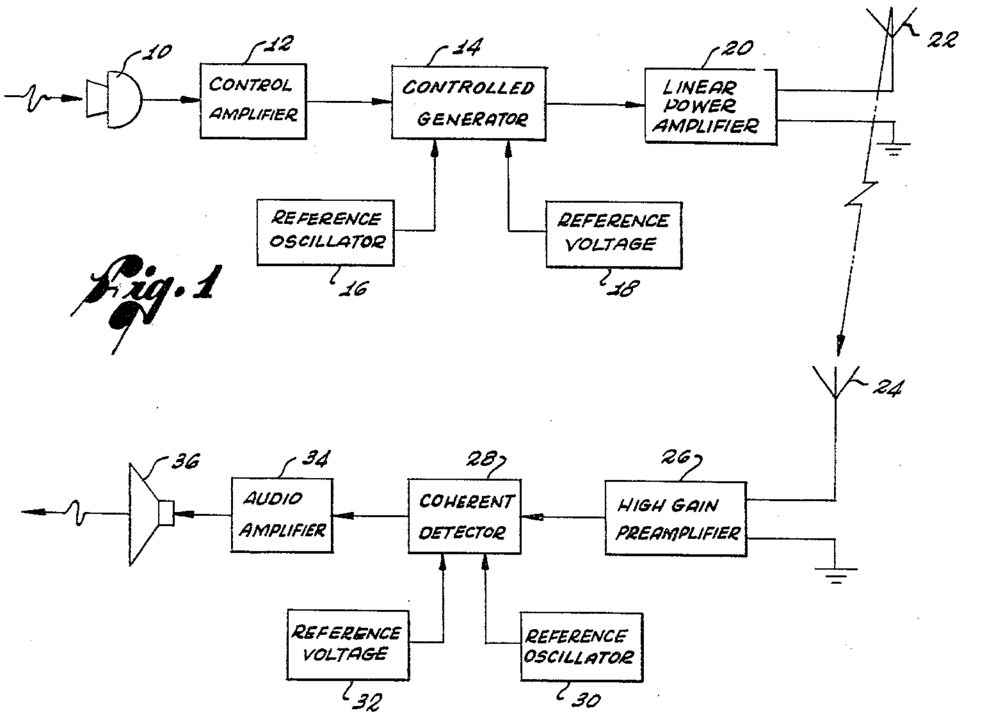
FIGURE 1 is a generalized block diagram of a high Q communication system in accordance with this invention.

A communication system according to this invention is generally shown in block diagram form in FIGURE 1. An input signal is established with a suitable transducer, such as a microphone 10 used in voice communication, and the electrical output signal from the transducer is fed to a control amplifier 12. The output signal from the control amplifier 12 is used to control a controlled generator 14 by modulating an element thereof. That is, the generator 14 is parameter modulated.

A reference frequency oscillator 16 and a reference voltage source 18 are used to provide a reference frequency and a reference voltage, respectively, which are utilized for phase and amplitude comparison control of the generator 14 so as to maintain certain generated signal characteristics under all variations over the full modulation range. The result is an input-controlled, modulated oscillation signal which is characteristically confined to an extremely well defined energy distribution spectrum. This signal is amplified by a buffer amplifier, shown as a linear power amplifier 20, which preserves the waveshape of the signal, and such signal is radiated by transmitting antenna 22. The modulated oscillation signal can be fed directly to antenna 22 when it is desired to operate the system without the amplifier 20.

The modulated oscillation signal radiated by antenna 22 is received by receiver antenna 24. A high gain preamplifier 26 amplifies the received signal and feeds it to a coherent detector 28. The received signal can be fed directly to the detector 28 when it is desired to operate the system without the preamplifier 26. As in the transmitter, a reference frequency oscillator 30 and a reference voltage source 32 are used to provide a reference frequency and a reference voltage, respectively, which are utilized for phase and amplitude comparison control of the coherent detector 28.

Coherent detection involves the process of beating a comparison signal against the received signal and adjusting the comparison signal so that no difference exists between the comparison signal and the received, incoming signal. Coherent detection thus takes place by duplication of the incoming waveform and this is essentially the function of the coherent detector 28. The phase and amplitude comparison control employed in the detector 28 results in the generation of a comparison signal which is closely confined to a controlled energy distribution spectrum. Tracking of the incoming signal is accomplished by adjusting the reference frequency of oscillator 30 to match the carrier of the incoming signal. Once the carrier of the incoming signal is located, tracking is automatic. Since the generated comparison signal is confined to an extremely well defined energy distribution spectrum, comparison takes place at very narrow bandwidth as the detector instantaneously follows the modulation excursions of the incoming signal. For greater stability, automatic frequency control of the reference oscillation can be employed for slow corrections of carrier drift, and/or Doppler effects.

The output of the detector 28 is fed to an audio amplifier 34 which, in turn drives a speaker 36 to produce an output signal. Comparison of the generated comparison signal with the incoming signal at very narrow bandwidth enables the system to perceive modulation in the presence of much noise. As in a phase-locked loop system, but in much greater degree, the detector essentially reaches into the noise, perceiving a signal of much less energy than the noise. It should be noted that the incoming signal can be an ordinary amplitude modulated signal produced by conventional transmitters, and detection is still highly sensitive under conditions of extreme noise. A greately increased receiver sensitivity is possible because the generated comparison signal is a precisely phase-locked and amplitude-locked duplicate of the incoming signal and comparison occurs continuously and instantaneously at very narrow bandwidth.

Figure 2:
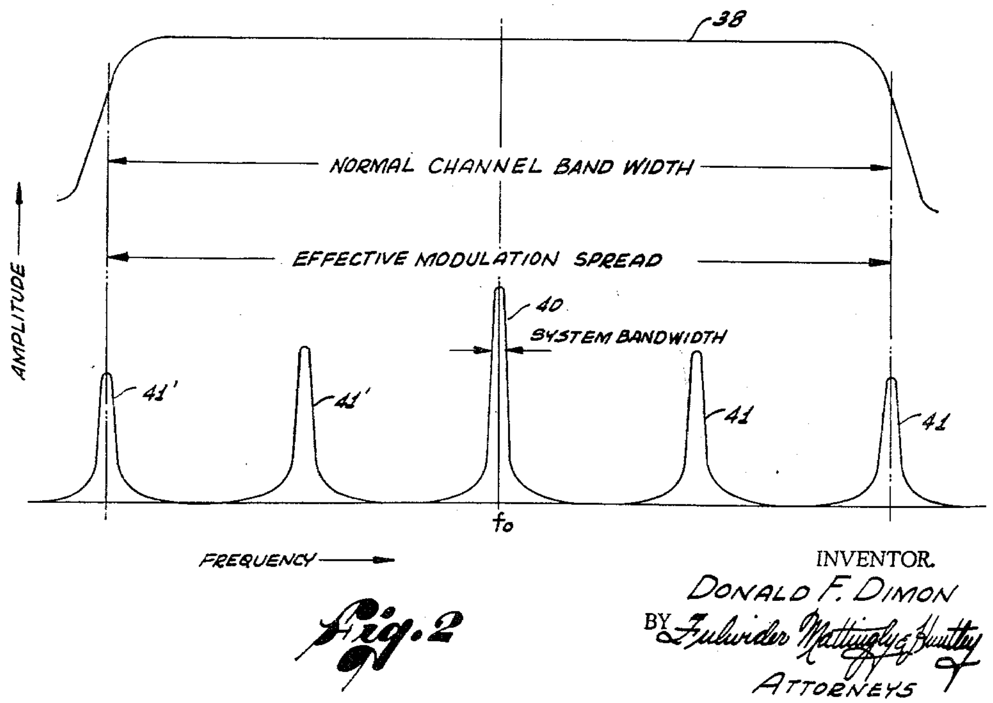
FIGURE 2 is a composite graph illustrating system bandwidth of the high Q communication system in comparison with a normal communication channel bandwidth.

A comparison of bandwidth requirement for a normal communication channel and that of the present system is illustrated in FIGURE 2. The bandwidth required to accommodate the frequency spectrum of a normal radio broadcasting channel is indicated by curve 38 in the upper part of the graph shown in FIGURE 2. The effective modulation spread is usually about 20 kilocycles ($\pm 10$ kilocycles from $f_0$) which is broad enough at all times to include all of the important side bands for normal radio broadcast purposes.

In contrast, system bandwidth of this invention is schematically shown in the lower part of the graph in FIGURE 2. As was mentioned previously, the signal generated in the system for either transmission or comparison purposes is confined to a controlled energy distribution spectrum. The system bandwidth indicated in FIGURE 2 is less than a few cycles wide at any instant, e.g., at 40 when only the carrier $f_0$ is present, and at 41, 41' in the presence of sidebands. There are, of course, many more of the sidebands than those which are schematically depicted in FIGURE 2. However, it is evident that a great deal of noise is excluded from the system since only the tracked, locked-on incoming signal may be received, with a bandwidth of the high Q detector.

Figure 3:
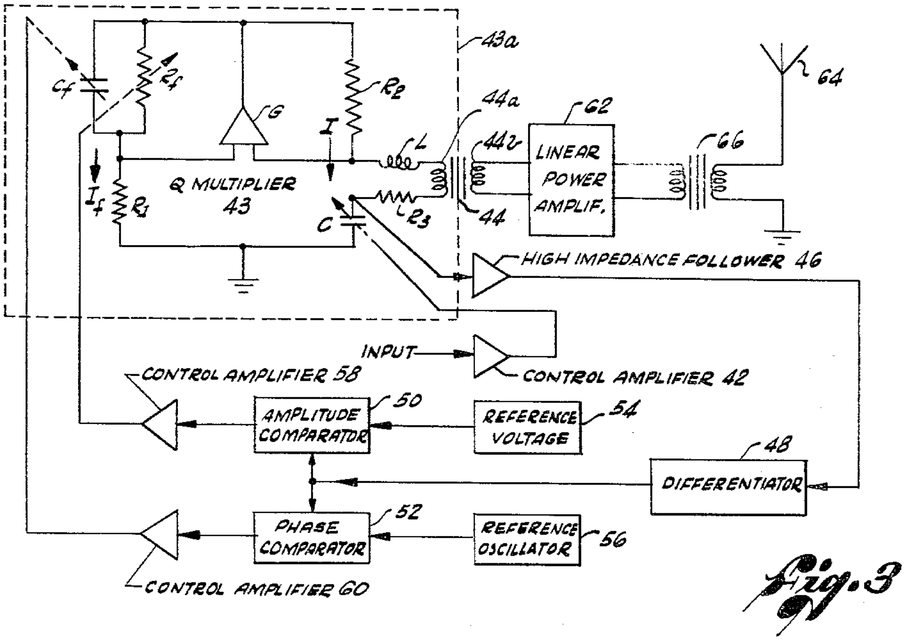
FIGURE 3 is a combined schematic and block diagram of the transmitter of the high Q system shown in FIGURE 1.

A high Q transmitter according to this invention is illustrated in FIGURE 3. An input signal which can be the output signal from a microphone, for example, is applied to a control amplifier 42. The output signal from the control amplifier 42 is utilized to vary the capacitance of a variable capacitor C which is connected in one arm of a bridge circuit. The capacitor C in one form may be a capacitor diode (varicap), the capacitance of which varies according to the magnitude of back direct voltage applied thereto, as by the control amplifier 42. In actual practice, the capacitor C in the arm of the bridge 43 includes a capacitor diode coupled to a fixed capacitor through a suitable isolating means, such as a toroid (isolation transformer). Other variable impedance means responsive to the output of the control amplifier 42 can also be used, e.g., a variable inductance, or a combination of responsively variable elements.

The bridge circuit is connected as a Meacham oscillator, with a high gain amplifier G as shown in FIGURE 3. This type of oscillator has excellent waveform and stability, and performs in a manner which makes a tuned element or network appear to have a greater magnified Q at or near resonance. For this reason, the bridge circuit including amplifier G as shown in FIGURE 3 is identified as a Q multiplier bridge 43. The bridge 43 is suitably shielded by shielding **43*a*. The Mecham oscillator is often used for precision laboratory type signal generators where a pure sinusoidal waveform is required. A primary winding 44*a* of a transformer 44 is connected in series with the variable capacitor C in the same arm of the Q multiplier bridge 43. The primary winding 44*a*** includes inductance L and resistance $R_3$ as indicated in FIGURE 3. Inductance L and capacitor C can be, of course, substituted by other tuned elements such as a resonant tank, resonant line, etc., or a quartz crystal.

The left branch of the Q multiplier bridge 43 has a corresponding lower arm including a resistor $R_1$. The upper arm of the right branch of the Q multiplier bridge 43 includes a resistor $R_2$, and the corresponding upper arm in the left branch comprises a parallel combination of variable resistor $R_f$ and variable capacitor $C_f$. The input of a high gain amplifier G with low phase shift characteristic is connected between the centers of the left and right branches of the Q multiplier bridge 43, and the output of the amplifier G is connected across the ends of the bridge 43.

In the high Q transmitter shown in FIGURE 3, the resistor $R_f$ is controlled to just allow oscillations to occur in the bridge oscillator or Q multiplier bridge 43. The bridge will balance at a resonant frequency of $(1/LC)^{1/2}$ without capacitor $C_f$ in the circuit, and at a frequency near this when capacitor $C_f$ is small. In order to understand the invention more fully, a consideration of the circuital equations will be helpful at this point.

The consideration of the circuital equations will be simplified by arbitrarily letting $R_1=R_2=R_3=R$. This is an arbitrary condition as bridge balance is still dependent on $R_f$ and other factors. The input voltage to the high gain amplifier G is assumed to be negligible.

Denoting current flow in the left branch of the Q multiplier bridge 43 as I, that in the right branch as I, and using P to denote a differential operator with respect to time, the lower and upper loop equations for the bridge 43 can be written as $$\left(PL+R+\frac{1}{PC}\right)I-RI_f=0 \qquad \text{Eq. (1)}$$

and $$RI-\frac{I_f}{PC_f+1/R_f}= \qquad \text{Eq. (2)}$$

From Eq. 2, $$I_f=\frac{R(PR_fC_f+1)I}{R_f} \qquad \text{Eq. (3)}$$

Substituting into Eq. 1, $$\left(PL+R+\frac{1}{PC}\right)I-\frac{R^2(PR_fC_f+1)I}{R_f}=0$$

$$PLI+RI+\frac{I}{PC}-PR^2C_fI-\frac{R^2}{R_f}I=0$$

Rewriting with $1/C$ as the variable, $$PLC\frac{I}{C}+RC\frac{I}{C}+\frac{1}{P}\frac{I}{C}-PR^2C_fC\frac{I}{C}-\frac{R^2C}{R_f}\frac{I}{C}=0$$

Rearranging, $$P^2(LC-R^2C_fC)\frac{I}{C}+P\left(RC-\frac{R^2C}{R_f}\right)\frac{I}{C}+\frac{I}{C}=0 \qquad \text{Eq. (4)}$$

From Eq. 4, it can be seen that a second order system in the variable $I/C$ is obtained if $$(LC-R^2C_fC)=\frac{1}{w^2} \qquad \text{Eq. (5)}$$

where $w$ is a constant, and $$\left(RC-\frac{R^2C}{R_f}\right)=0 \qquad \text{Eq. (6)}$$

Then Eq. 4 becomes $$\frac{P^2}{w^2}\frac{I}{C}+\frac{I}{C}= \qquad \text{Eq. (7)}$$

The solution of Eq. 7 is $$\frac{I}{C}=A_1e^{jwt}+A_2e^{-jwt}$$

or $$\frac{I}{C}=(A_1+A_2)\cos wt+j(A_1-A_2)\sin wt \quad \text{Eq. (8)}$$

Letting $$A_1+A_2=A, \text{ and } A_1-A_2=B$$

$$\frac{I}{C}=A\cos wt+jB\sin wt \quad \text{Eq. (9)}$$

and $$\frac{I}{C}=A^2+B^2\sin\left(wt+\tan^{-1}\frac{A}{B}\right)$$

or for brevity, $$\frac{I}{C}=K\sin(wt+a) \quad \text{Eq. (10)}$$

Let C be modulatable such that $$C=C_0+C_m\sin mt \quad \text{Eq. (11)}$$

In Eq. 10 let the constant phase angle $a$ be chosen as zero since it plays no part in the process of modulation. Then, $$I=C\cdot K\sin wt \quad \text{Eq. (12)}$$

and $$I=(C_0+C_m\sin mt)\cdot K\sin wt \quad \text{Eq. (13)}$$

Rewriting Eq. 13 yields $$I=K(C_0+C_m\sin mt)\sin wt \quad \text{Eq. (14)}$$

Let $$k_m=C_m/C_0$$

and $$I_0=KC_0$$

Thus, Eq. 14 can be written as $$I=I_0(l+k_m\sin mt)\sin wt \quad \text{Eq. (15)}$$

The absence of a damping term in Eq. 10 for a pure sinusoidal signal implies an infinite Q controlled oscillation in the variable $I/C$ at a constant carrier frequency $w$. Also, from Eq. 15, it can be recognized that the current I which flows through the primary winding *44a* of transformer 44 is a controlled amplitude modulated oscillation having a modulation frequency $m$.

The conditions set forth under Eq. 5 and Eq. 6 are preferably satisfied by electrical servo control in this invention. The voltage across capacitor C is seen to be $I/PC$. Differentiating gives $I/C$, the variable in the above second order system as given in Eq. 7. In FIGURE 3, the voltage across capacitor C is sampled without introducing loading thereto by a high input impedance follower amplifier 46, and the output thereof is differentiated by differentiator 48 to provide the required signal $I/C$. In practice, the differentiator 48 is usually incorporated in the circuitry associated with the follower amplifier 46.

The signal $I/C$ is applied to an amplitude comparator 50 and a phase comparator 52. A reference voltage from a source 54 and a reference frequency from an oscillator 56 are respectively provided to the amplitude comparator 50 and the phase comparator 52. Any error signal obtained from the amplitude comparator is applied to control amplifier 58 which produces a signal to gently vary the resistance of resistor $R_f$ to just allow oscillations to occur in multiplier bridge oscillator 43, so that the condition given by Eq. 6 is maintained. The voltage of source 54 and frequency of oscillator 56 are set to produce the desired magnitude and frequency of the controlled oscillation.

In one arrangement, the resistor $R_f$ is the output impedance of an emitter follower which is connected to the control amplifier 58. In this instance, the control amplifier 58 is a D.C. amplifier wherein the output thereof controls the operating point of the emitter follower. The emitter follower is substantially the same as a cathode follower, and the output impedance thereof is essentially the reciprocal of its transconductance.

As is well known, the transconductance of a junction transistor is determined by the curves of base to emitter voltage plotted against emitter current. By shifting the operating point through changing the emitter current, the transconductance is controlled smoothly over a two-to-one ratio while staying on the portion of the curves that the transconductance varies linearly. By padding the reflected impedance of the reciprocal of the transconductance with fixed resistors, a smooth control of a variable resistance $R_f$ is obtained by variation of the input signal to the emitter follower. Other variable resistance means can also be used, of course.

The resistor $R_f$ is thus adjusted to maintain constant amplitude oscillations in the Q multiplier bridge 43. At the same time, the capacitor $C_f$ is varied by the output from control amplifier 60 when the phase comparator 52 senses a phase difference between the signal $I/C$ and the reference frequency signal from oscillator 56. Capacitor $C_f$ is adjusted to hold a constant value of $l/w^2$ as provided by Eq. 5. Thus, the phase of the oscillation of the Q multiplier bridge 43 is held constant (phase locked) with that of a predetermined reference or carrier frequency signal. It should be noted that the constant magnitude and constant phase oscillations refer to oscillations in the variable $I/C$, and oscillations in $I$ clearly are not constant in magnitude and phase with parameter modulation of the system.

While an infinite Q controlled oscillation in the variable $I/C$ is thus implied, in practice there is a small amount of damping which is determined by the gain of the amplifier G. This oscillation is parameter modulated by capacitor C, and the amplitude modulated controlled signal at the output of amplifier G has a voltage equal to 2RI across the right branch of the Q multiplier bridge 43. This modulated signal is fed to linear power amplifier 62 through the secondary winding *44b* of transformer 44, and the output of amplifier 62 is coupled to transmitting antenna 64 through a transformer 66.

The frequency spectrum of the amplitude modulated controlled oscillation is similar to an ordinary amplitude modulated broadcast signal. However, since the waveform of the carrier is held purely sinusoidal by the high Q circuit, distortion is very low, and the various frequencies involved in modulation are closely confined to the exact mathematical solution of Eq. 15. Thus, the various modulation frequency components or side bands are each held to a very narrow bandwidth as established for the carrier. This is illustrated in the lower portion of FIGURE 2.

Figure 4:
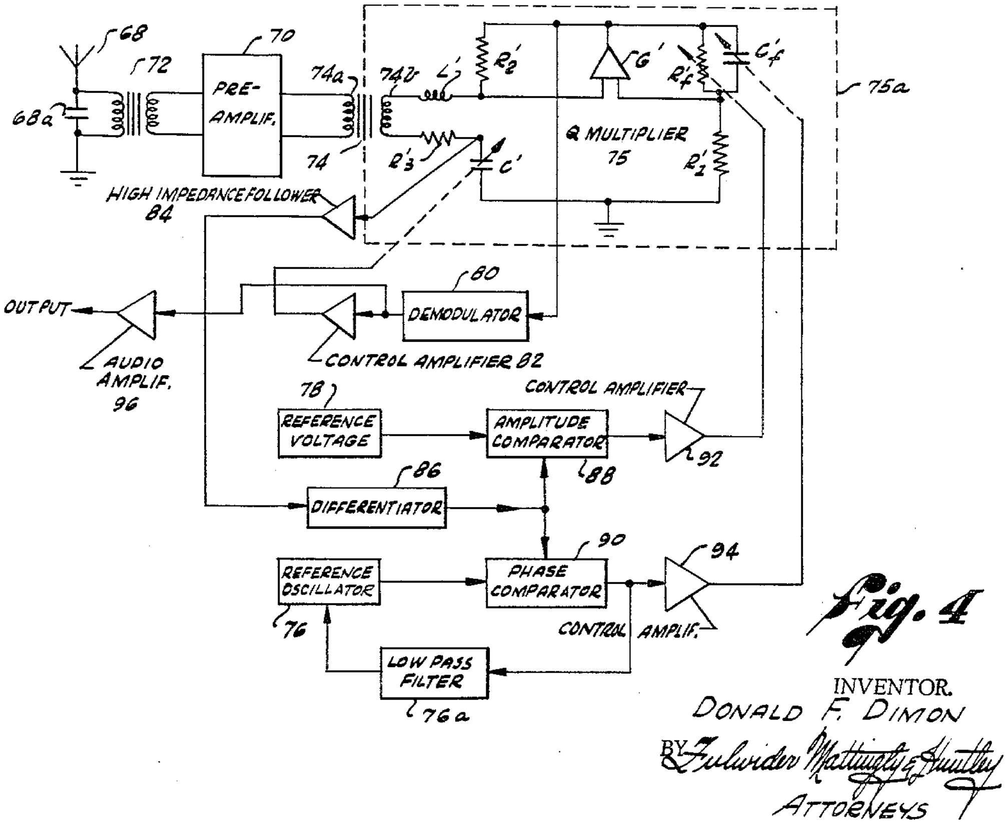
FIGURE 4 is a combined schematic and block diagram of the receiver of the high Q system shown in FIGURE 1.

The high Q receiver shown in FIGURE 4 is similar to the high Q transmitter of FIGURE 3. For convenience, primes of the reference characters for the transmitter elements are used to designate corresponding receiver elements. An ordinary amplitude modulated signal is received by antenna 68 and directed to preamplifier 70 through an input transformer 72. The primary winding of transformer 72 is connected across capacitor *68a* as shown. The amplified output of the preamplifier 70 appears on the primary winding *74a* of a transformer 74 and is coupled to the secondary winding *74b*. The winding *74b* includes an inductance L' and a resistance $R_3'$, which are similar to the inductance L and the resistance R of the primary winding *44a* of the transformer 44 shown in FIGURE 3.

The winding *74b* is connected in series with a variable capacitor C' in the lower arm of the left branch of a Q multiplier bridge 75 as shown in FIGURE 4. The Q multiplier bridge 75 is similar to the bridge 43 of FIGURE 3, and is suitably shielded by shielding *75a*. The Q multiplier bridge 75 operates and functions in a manner generally similar to the bridge 43 in the transmitter portion of the high Q system.

In the bridge 43 of the transmitter, an amplitude modulated controlled oscillation from the amplifier G is impressed across the ends of the bridge 43 so that the signal is provided to transformer 74 for output. However, in the receiver, an amplitude modulated controlled oscillation is fed to the transformer 74 as an input to the Q multiplier bridge 75. A comparison signal is generated by the bridge 75 and controlled to duplicate the incoming signal. The comparison signal is generated and confined to an extremely well defined energy distribution spectrum so that comparison takes place with a narrow bandwidth signal.

Reference oscillator 76 can be adjusted to change the reference frequency so that the Q multiplier bridge 75 is maintained at an oscillatory frequency corresponding to the carrier frequency of the received, incoming signal. Reference voltage source 78 provides a reference voltage for maintaining the amplitude of the oscillation of bridge 75 at a predetermined constant value and thus eliminate damping of the oscillation. Modulation of the oscillation to duplicate the incoming signal is accomplished by using a demodulated output of the bridge 75 to vary the capacitor C′.

The output across the ends of the bridge 75, of course, includes the modulated input signal appearing on the transformer 74 and its secondary winding **74*b*. This signal is fed to a demodulator 80 which detects the envelope of the modulated signal. The detected signal is amplified by control amplifier 82 and the output thereof is used to vary the capacitance of the capacitor C′. The oscillations of the Q multiplier bridge 75** are thus parameter modulated to duplicate the envelope of the incoming signal.

As in the transmitter, the voltage across capacitor C′ is given by $I'/PC'$, where I′ is the current flow in the left branch of the bridge 75, corresponding to current I of bridge 43. The voltage across capacitor C′, of course, follows the envelope detected by modulator 80. This voltage is sampled by a high impedance follower amplifier 84 and is differentiated by differentiator 86 to produce the signal variable $I'/C'$. This signal variable is applied to both the amplitude comparator 88 and the phase comparator 90 as indicated in FIGURE 4.

An output signal is provided from the amplitude comparator 88 when the value of the signal variable $I'/C'$ is different from the reference voltage from source 78. This output signal is fed to control amplifier 92 to adjust the variable resistor $R_f'$ so that the condition as given by Eq. 6 is maintained. Similarly, when the phase of the signal variable $I'/C'$ or oscillations of the bridge 75 is different from that of the reference frequency of oscillator 76, an output signal is obtained from the phase compartor 90 and fed to control amplifier 94 to adjust the variable capacitor $C_f'$ so that the condition as given by Eq. 5 is maintained.

The output from the phase comparator 90 is also passed through a low pass filter **76*a* to provide a slowly variable D.C. signal which is a measure of the difference in frequency between the carrier ($I'/C'$) and the reference frequency of oscillator 76. The reference oscillator 76 is preferably a crystal oscillator which can be connected as a Meacham oscillator having a variable capacitor connected in parallel, for example, with its crystal. The capacitance of this variable capacitor is varied by the output of the low pass filter 76*a*, so that the oscillation frequency of the oscillator 76** is changed according to carrier drift, for example.

The reference frequency of oscillator 76 and reference voltage of source 78 are adjusted for optimum tracking of the carrier frequency oscillations of the incoming, modulated signal. As an alternative to adjusting the reference voltage, the gain of preamplifier 70 can be adjusted instead, or both reference voltage and gain can be varied for optimum reception. The Q multiplier bridge 75 instantaneously follows the carrier excursions of the incoming signal, as controlled by the derived signal representing the variable $I'/C'$, and is adjusted for the infinite Q conditions required by Eq. 5 and Eq. 6 which are, of course, applicable to bridge 75 as well as bridge 43. The oscillations of the Q multiplier bridge 75 are further modulated so that the envelope of these oscillations is a duplicate of that of the incoming signal.

These oscillations are produced in a continuously maintained high Q circuit, and modulation is accomplished by parameter variation so that the resultant modulated oscillation is confined to a well defined, narrow bandwidth energy distribution spectrum determined solely by the intelligence or modulation involved. Thus, noise is essentially fully removed and omitted from the duplicated signal, and a noise-free signal is obtained following demodulation. The demodulated signal is fed to audio amplifier 96 to provide an output which is not obscured by noise.

By maintaining the conditions given in Eq. 5 and Eq. 6, a second order system in the variable $I/C$ is obtained wherein the damping term is absent, as in Eq. 7, such that an infinite Q controlled oscillation in the variable $I/C$ is essentially generated in the Q multiplier bridge 43. In like manner, an infinite Q oscillation in the variable $I'/C'$ is essentially generated in the bridge 75. In practice, there is, of course, a small amount of damping which is determined by the gain of the amplifier G′.

Since parameter modulation is employed involving the variable capacitor C′, which is part of the variable $I'/C'$, the narrow bandwidth associated with the infiinate Q oscillation is extended to all variations of the variable $I'/C'$. That is, all side bands as well as the carrier produced on variation or modulation of the capacitor C′, are confined to the same narrow bandwidth of the second order system. Thus, the bandwidth comparison chart of FIGURE 2 is also applicable to the receiver of the high Q system as well as the transmitter.

From Eq. 5, it can be seen that it is possible to adjust L (and L′) by servo action instead of $C_f$ (and $C_f'$). If such an inductance is adapted for servo control, the variable capacitor $C_f$ (and $C_f'$) can be eliminated. It is, of course, possible and sometimes desirable to adjust both inductance L and variable capacitor $C_f$ simultaneously to maintain the relationship of Eq. 5. In another variation, capacitors C and $C_f$ are both modulated by the input signal in a cooperative fashion so as to allow the relation given by Eq. 5 to be more closely held. Both capacitor C and the capacitor $C_f$ in such arrangement are controlled by the input signal through respective control amplifiers. The control amplifier 42 may be characteristically such that capacitor C cannot be varied as functionally desired with the input signal. The capacitor $C_f$ is varied by a control amplifier (not shown) which is characteristically constructed to compensate for the deficiency of the control amplifier 42. That is, control amplifier 42 varies capacitor C in a first order fashion whereas the other control amplifier controls the capacitor $C_f$ according to a second order or degree function so that the combined control insures correct performance. However, an additional servo controlled variable capacitor (not shown) preferably would be connected in circuit (in parallel or series) with either capacitor C or $C_f$, or in another arm of the bridge 43, to allow free balancing to occur by servo control. This additional capacitor would, of course, be responsive to control amplifier 60.

The resistance in the different arms of the bridges 43 and 75 have been considered as having approximately unity ratio for respective branches thereof, for illustration herein. However, a different ratio can be used to advantage while still permitting each bridge to balance. The resistors $R_f$ and $R_1$ (FIGURE 3) represent a power drain on the Q multiplier bridge 43 and on the amplifier G. By raising the resistances of $R_f$ and $R_1$ so as to make the current $I_f$ through the left branch small in comparison to the current I through the right branch of the bridge 43, a saving on the drain can be obtained. The power drain can be further reduced by reducing the resistance of resistor $R_2$ which is in series with the load current I. But a reduction of the resistor $R_2$ would change the ratio of resistance in the right branch of the bridge 43 so that the ratio of resistances of $R_f$ and $R_1$ must be suitably changed to conform. There are actually other factors, such as the input impedance and gain of amplifier G, capacity of $C_f$, etc., which are affected and must be considered and suitably adjusted, of course, in using different impedance ratios.

The receiver shown in FIGURE 4 can detect signals wherein the modulation bandwidth is very large compared to the carrier frequency as, for example, a 1 mc./sec. carrier with upper and lower bands of side bands extending over ±200 kc./sec. The reason for this is, of course, due to the low noise, narrow system bandwidth existing throughout the entire modulation spread as can be readily seen from the graph of FIGURE 2. Thus, it is possible to handle television signals at very low carrier frequencies.

The effective modulation spread as indicated in FIGURE 2 for the normal channel bandwidth would become intolerably widened where the modulation bandwith is greatly increased. In this instance, it is not possible to retain all of the important side bands without using a receiver having an extremely wide bandwidth. However, too much noise would be detected with such a receiver.

As discussed above, the high Q receiver shown in FIGURE 4 covers the entire spectrum associated with the modulation but excludes all but the carrier and side bands involved. The system bandwidth is, for example, less than a few cycles wide for each of the frequencies involved. Thus, only the essentially useful portion of the spectrum is utilized, as indicated in FIGURE 2.

When two (or more) high Q resonant systems are operating on the same, or approximately the same frequency, and no shielding is used and each is allowed to couple directly to an antenna system without an isolating amplifier, there is usually some coupling between the systems. The two (or more) systems are really one system when any coupling exists. Generally considered, the (critical) coupling required for maximum energy transfer between two coupled systems is inversely proportional to the square root of the product of the respective system Q's. As the product of the Q's approach infinity, the required coupling for high maximum energy transfer approaches zero. Thus, the greater the product of the Q's, the farther apart can be the concerned systems and still remain critically coupled wherein maximum energy transfer occurs. This is the case in the high Q system shown in FIGURE 1, when buffer amplifiers are not used between resonant sections and the antennas. That is, linear power amplifiers 20 and 62, and high gain preamplifiers 26 and 70 are omitted, and the controlled generator 14, the multiplier bridge 43, the coherent detector 28, and the multiplier bridge 75, less shielding 43a and 75a, are closely coupled directly to the antennas in their respective circuits. Actually, a portion of either or both multiplier bridges 43 and 75 can be used for antenna systems, and high energy transfer still takes place between transmitter and receiver. It should be noted that the multiplier bridge 43 may put out enough power so as not to require use of a power amplifier such as 62.

There is, of course, a practical limit as to how high the Q of a system can be made. But if the Q can be extremely high as in the high Q receiver shown in FIGURE 4, high energy transfer can take place even with another system having a relatively low Q. Thus, the high Q receiver performs extremely well even with an ordinary transmitter that does not use a buffer amplifier between resonant section and antenna. Of course, the high Q receiver still performs very well even if the ordinary transmitter uses such a buffer amplifier, because of its extremely narrow bandwidth as discussed above.

The high Q system has been described with respect to amplitude modulation of the carrier. However, the system can be suitably modified to operate with other forms of modulation such as frequency modulation, phase modulation, pulse position modulation, etc. Single side band transmission and other forms of transmission encountered with existing communication systems can be incorporated in the high Q system. The system is modified by simply incorporating the particular type of operative component as required in place of the indicated component shown in the preferred embodiment disclosed. For example, the AM demodulator 80 of FIGURE 4 can be replaced with an FM demodulator when the receiver is used for FM reception. Similar modifications can be easily made together with appropriate adaptive adjustments of associated circuitry.

Various modifications can be made in the high Q system without limiting its performance. For example, the Q multiplier bridges 43 and 75 are not limited to the precise circuits shown in FIGURES 3 and 4. A variation of the bridges 43 and 75 is to use a series combination instead of a parallel combination in the upper arms of the left branches of the bridges, and to then interchange positions of the upper and lower arms of the left branches. Thus resistor $R_1$ would be connected in the upper arm of the left branch of the Q multiplier bridge 43, and a series combination of variable capacitor $C_f$ and variable resistor $R_f$ is connected as the lower arm of the left branch of the bridge 43. Capacitor $C_f$ and resistor $R_f$ are servo controlled as before to maintain conditions similar to those designated by Eq. 5 and Eq. 6. Other variations of the different conventional components of the system can, of course, be made.

It is well known that the electrical systems, shown in FIGURES 3 and 4, for example, have analogous mechanical counterparts. Thus, a mechanical oscillatory or vibration system can be obtained by using suitable analogous mechanical elements in place of the electrical elements shown in FIGURES 3 and 4. All of the corresponding benefits, uses, etc. of a narrow bandwidth mechanical vibration system are, of course, obtained. A mechanical vibration system analogous to the circuit of FIGURE 4 is clearly useful for seismic research, for example.

The invention is not limited to the specific configuration shown and, for example, embraces the method and means for achieving a mechanical vibrational system of narrow frequency bandwidth useful for semismic research or communication systems, using the principles disclosed herein for an electronic system but utilizing analogous mechanical elements corresponding to the electrical elements of the electronic system. Thus, it is to be understood that the particular embodiment described above and shown in the drawings is merely illustrative of, and not restrictive on the broad invention, and that various changes in design, structure, and arrangement may be made without departing from the spirit and scope of the appended claims.

I claim:

1. A high Q communication system, comprising:

a transmitter including:

- a Q multiplier bridge oscillator for producing an oscillation;
- means for modulating said transmitter oscillation according to an input signal;
- means for maintaining the amplitude and phase of said transmitter oscillation at predetermined values;
- output means coupled and said transmitter bridge oscillator for providing a modulated oscillation signal from said transmitter;

and a receiver including:

- input means for receiving said modulated oscillation signal;
- a Q multiplier bridge oscillator for producing an oscillation and coupled to said input means;

means for maintaining the amplitude and phase of said receiver oscillation at predetermined values;

means connected to said receiver bridge oscillator for demodulating said modulated oscillation signal and producing a demodulated signal;

means responsive to said demodulated signal for modulating said receiver oscillation in accordance with variation of said demodulated signal to produce a duplicate of said modulated oscillation signal; and output means coupled to said demodulator for providing a demodulated output signal from said receiver.

2. A high Q communication system, comprising:

a transmitter including:

a Q multiplier bridge oscillator producing an oscillation, an arm of said bridge oscillator including a variable parameter element;

means for varying said transmitter parameter element according to an input signal whereby said transmitter oscillation is modulated according to said input signal;

means for maintaining the amplitude and phase of said transmitter oscillation at predetermined values; and output means coupled to said transmitter bridge oscillator for providing a modulated oscillation signal from said transmitter;

a receiver including:

input means for receiving said modulated oscillation signal;

a Q multiplier bridge oscillator for producing an oscillation and coupled to said input means, an arm of said bridge oscillator including a variable parameter element;

means for maintaining the amplitude and phase of said receiver oscillation at predetermined values;

means connected to said receiver bridge oscillator for demodulating said modulated oscillation signal and producing a demodulated signal;

means responsive to said demodulated signal for varying said receiver parameter element in accordance with variations of said demodulated signal whereby said receiver oscillation is modulated according to said demodulated signal, to produce a duplicate of said modulated oscillation signal; and output means coupled to said demodulator for providing a demodulated output signal from said receiver.

3. A high Q communication system, comprising:

a transmitter including:

a Q multiplier bridge oscillator for producing an oscillation to be controlled, an arm of said transmitter bridge oscillator including a variable resistance element and a variable reactance element;

means for modulating said transmitter oscillation according to an input signal;

means for sampling said transmitter oscillation and comparing the amplitude and phase thereof respectively with a reference voltage and a reference frequency to produce an amplitude error signal and a phase error signal according to differences between amplitudes and phases;

means responsive to said transmitter amplitude error signal and said transmitter phase error signal for varying said transmitter resistance element and said transmitter reactance element, respectively, to maintain the amplitude and phase of said transmitter oscillation at predetermined values; and output means coupled to said transmitter bridge oscillator for providing a modulated oscillation signal from said transmitter;

and a receiver including:

input means for receiving said modulated oscillation signal;

a Q multiplier bridge oscillator for producing an oscillation to be controlled and coupled to said input means, an arm of said receiver bridge oscillator including a variable resistance element and a variable reactance element;

means for sampling said receiver oscillation and comparing the amplitude and phase thereof with a reference voltage and a reference frequency to produce an amplitude error signal and a phase error signal according to differences between amplitudes and phases;

means responsive to said receiver amplitude error signal and said receiver phase error signal for varying said receiver resistance element and said receiver reactance element, respectively, to maintain the amplitude and phase of said receiver oscillation at predetermined values;

means connected to said receiver bridge oscillator for demodulating said modulated oscillation signal and producing a demodulated signal;

means responsive to said demodulated signal for modulating said receiver oscillation in accordance with variations of said demodulated signal to produce a duplicate of said modulated oscillation signal; and output means coupled to said demodulator for providing a demodulated output signal from said receiver.

4. A high Q communication system, comprising:

a transmitter including:

a Q multiplier bridge oscillator for producing an oscillation, an arm of said transmitter bridge oscillator including a variable parameter element, and another arm including a variable resistance element and a variable reactance element;

means for sampling said transmitter oscillation and comparing the amplitude and phase thereof with a reference voltage and a reference frequency to produce an amplitude error signal and a phase error signal according to differences between amplitudes and phases;

means responsive to said transmitter amplitude error signal and said transmitter phase error signal for varying said transmitter resistance element and said transmitter reactance element, respectively, to maintain the amplitude and phase of said transmitter oscillation at predetermined values;

means for varying said transmitter parameter element according to an input signal whereby said transmitter oscillation is modulated according to said input signal; and output means coupled to said transmitter bridge oscillator for providing a modulated oscillation signal from said transmitter;

and a receiver including:

input means for receiving said modulated oscillation signal;

a Q multiplier bridge oscillator for producing an oscillation and coupled to said input means, an arm of said receiver bridge oscillator including a variable parameter element, and another arm including a variable resistance element and a variable reactance element;

means for sampling said receiver oscillation and comparing the amplitude and phase thereof respectively with a reference voltage and a reference frequency to produce an amplitude error signal and a phase error signal according to differences between amplitudes and phases;

means responsive to said receiver amplitude error signal and said receiver phase error signal for varying said receiver resistance element and said receiver reactance element, respectively, to maintain the amplitude and phase of said receiver oscillation at predetermined values;

means connected to said receiver bridge oscillator for demodulating said modulated oscillation signal and producing a demodulated signal;

means responsive to said demodulated signal for varying said receiver parameter element in accordance with variations of said demodulated signal whereby said receiver oscillation is modulated according to said demodulated signal, to produce a duplicate of said modulated oscillation signal; and output means coupled to said demodulator for providing a demodulated output signal from said receiver.

5. A high Q communication system, comprising:

a transmitter including:

a Q multiplier bridge oscillator for producing an oscillation, an arm of said transmitter bridge oscillator including a variable capacitance diode, and another arm including a variable resistance element and a variable capacitance element;

means for sampling said transmitter oscillation comparing the amplitude and phase thereof with a reference voltage and a reference frequency to produce an amplitude error signal and a phase error signal according to differences between amplitudes and phases;

means responsive to said transmitter amplitude error signal and said transmitter phase error signal for varying said transmitter resistance element and said transmitter capacitance element, respectively, to maintain the amplitude and phase of said transmitter oscillation at predetermined values;

means for varying said transmitter capacitance diode according to an input signal whereby said transmitter oscillation is modulated according to said input signal; and output means coupled to said transmitter bridge oscillator for providing a modulated oscillation signal from said transmitter;

and a receiver including:

input means for receiving said modulated oscillation signal;

a Q multiplier bridge oscillator for producing an oscillation and coupled to said input means, an arm of said receiver bridge oscillator including a variable capacitance diode, and another arm including a variable resistance element and a variable capacitance element;

means for sampling said receiver oscillation and comparing the amplitude and phase thereof respectively with a reference voltage and a reference frequency to produce an amplitude error signal and a phase error signal according to differences between amplitudes and phases;

means responsive to said receiver amplitude error signal and said receiver phase error signal for varying said receiver resistance element and said receiver capacitance element, respectively, to maintain the amplitude and phase of said receiver oscillation at predetermined values;

means connected to said receiver bridge oscillator for demodulating said modulated oscillation signal and producing a demodulated signal;

means responsive to said demodulated signal for varying said receiver capacitance diode in accordance with variations of said demodulated signal whereby said receiver oscillation is modulated according to said demodulated signal, to produce a duplicate of said modulated oscillation signal; and output means coupled to said demodulator for providing a demodulated output signal from said receiver.

6. In a high Q communication system, a transmitter comprising:

a Q multiplier bridge oscillator for producing an oscillation, an arm of said bridge oscillator including a variable parameter element;

means for varying said parameter element according to an input signal whereby said oscillation is modulated according to said input signal;

means for maintaining the amplitude and phase of said oscillation at predetermined values; and output means coupled to said bridge oscillator for providing a modulated oscillation signal from said transmitter.

7. In a high Q communication system, a transmitter comprising:

a Q multiplier bridge oscillator for producing an oscillation, an arm of said bridge oscillator including a variable resistance element and a variable reactance element;

means for modulating said oscillation according to an input signal;

means for sampling said oscillation and comparing the amplitude and phase thereof respectively with a reference voltage and a reference frequency, to produce an amplitude error signal and a phase error signal according to differences between amplitudes and phases;

means responsive to said amplitude error signal and said phase error signal for varying said resistance element and said reactance element, respectively, to maintain the amplitude and phase of said oscillation at predetermined values; and output means coupled to said bridge oscillator for providing a modulated oscillation signal from said transmitter.

8. In a high Q communication system, a transmitter comprising:

a Q multiplier bridge oscillator for producing an oscillation, an arm of said bridge oscillator including a variable parameter element, and another arm including a variable resistance element and a variable reactance element;

means for sampling said oscillation and comparing the amplitude and phase thereof respectively with a reference voltage and a reference frequency, to produce an amplitude error signal and a phase error signal according to differences between amplitudes and phases;

means responsive to said amplitude error signal and said phase error signal for varying said resistance element and said reactance element, respectively, to maintain the amplitude and phase of said oscillation at predetermined values;

means for varying said parameter element according to an input signal whereby said oscillation is modulated according to said input signal; and output means coupled to said bridge oscillator for providing a modulated oscillation signal from said transmitter.

9. In a high Q communication system, a receiver circuit comprising:

input means for receiving a modulated oscillation signal;

a Q multiplier bridge oscillator for producing an oscillation and coupled to said input means;

means for maintaining the amplitude and phase of said oscillation at predetermined values;

means connected to said bridge oscillator for demodulating said modulated oscillation signal and producing a demodulated signal;

means responsive to said demodulated signal for modulating said oscillation in accordance with variations of said demodulated signal to produce a duplicate of said modulated oscillation signal; and output means coupled to said demodulator for providing a demodulated output signal from said receiver circuit.

10. In a high Q communication system, a receiver comprising:

input means for receiving a modulated oscillation signal;

a Q multiplier bridge oscillator for producing an oscillation and coupled to said input means, an arm of said bridge oscillator including a variable parameter element;

means for maintaining the amplitude and phase of said oscillation at predetermined values;

means connected to said bridge oscillator for demodulating said modulated oscillation signal and producing a demodulated signal;

means responsive to said demodulated signal for varying said parameter element in accordance with variations of said demodulated signal whereby said oscillation is modulated according to said demodulated signal, to produce a duplicate of said modulated oscillation signal; and output means coupled to said demodulator for providing a demodulated output signal from said receiver.

11. In a high Q communication system, a receiver comprising:

input means for receiving a modulated oscillation signal;

a Q multiplier bridge oscillator for producing an oscillation and coupled to said input means, an arm of said bridge oscillator including a variable resistance element and a variable reactance element;

means for sampling said oscillation and comparing the amplitude and phase thereof respectively with a reference voltage and a reference frequency, to produce an amplitude error signal and a phase error signal according to differences between amplitudes and phases;

means responsive to said amplitude error signal and said phase error signal for varying said resistance element and said reactance element, respectively, to maintain the amplitude and phase of said oscillation at predetermined values;

means responsive to said demodulated signal for modulating said oscillation in accordance with variations of said demodulated signal to produce a duplicate of said modulated oscillation signal; and output means coupled to said demodulator for providing a demodulated output signal from said receiver.

12. In a high Q communication system, a receiver comprising:

input means for receiving a modulated oscillation signal;

a Q multiplier bridge oscillator for producing an oscillation and coupled to said input means, an arm of said bridge oscillator including a variable parameter element, and another arm including a variable resistance element and a variable reactance element;

means for sampling said oscillation and comparing the amplitude and phase thereof respectively with a reference voltage and a reference frequency, to produce an amplitude error signal and a phase error signal according to differences between amplitudes and phases;

means responsive to said amplitude error signal and said phase error signal for varying said resistance element and said reactance element, respectively, to maintain the amplitude and phase of said oscillation at predetermined values;

means connected to said bridge oscillator for demodulating said modulated oscillation signal and producing a demodulated signal;

means responsive to said demodulated signal for varying said parameter element in accordance with variations of said demodulated signal whereby said oscillation is modulated according to said demodulated signal, to produce a duplicate of said modulated oscillation signal; and output means coupled to said demodulator for providing a demodulated output signal from said receiver.

References Cited by the Examiner

UNITED STATES PATENTS 2,163,403 6/39 Meacham ------------ 331—140

OTHER REFERENCES

Van Nostrand: "The International Dictionary of Physics and Electronics," page 768.

DAVID G. REDINBAUGH, *Primary Examiner.*